United States Patent
Zhai et al.

(10) Patent No.: US 11,321,796 B2
(45) Date of Patent: May 3, 2022

(54) ERROR MODELING METHOD AND DEVICE FOR PREDICTION CONTEXT OF REVERSIBLE IMAGE WATERMARKING

(71) Applicant: Wuyi University, Jiangmen (CN)

(72) Inventors: Yikui Zhai, Jiangmen (CN); Wenbo Deng, Jiangmen (CN); Ying Xu, Jiangmen (CN); He Cao, Jiangmen (CN); Junying Gan, Jiangmen (CN); Tianlei Wang, Jiangmen (CN); Junying Zeng, Jiangmen (CN); Chuanbo Qin, Jiangmen (CN); Chaoyun Mai, Jiangmen (CN); Jinxin Wang, Jiangmen (CN)

(73) Assignee: Wuyi University, Jiangmen (CN)

( * ) Notice: Subject to any disclaimer, the term of this patent is extended or adjusted under 35 U.S.C. 154(b) by 190 days.

(21) Appl. No.: 16/753,220

(22) PCT Filed: Sep. 27, 2018

(86) PCT No.: PCT/CN2018/107914
§ 371 (c)(1),
(2) Date: Apr. 2, 2020

(87) PCT Pub. No.: WO2020/051954
PCT Pub. Date: Mar. 19, 2020

(65) Prior Publication Data
US 2020/0250785 A1 Aug. 6, 2020

(30) Foreign Application Priority Data
Sep. 13, 2018 (CN) .......................... 201811071211.9

(51) Int. Cl.
*G06T 1/00* (2006.01)
*H04N 1/32* (2006.01)

(52) U.S. Cl.
CPC ....... *G06T 1/0028* (2013.01); *H04N 1/32347* (2013.01)

(58) Field of Classification Search
CPC ........... G06T 1/0028; G06T 2201/0051; G06T 2201/0083; G06T 2201/0203; H04N 1/32347
See application file for complete search history.

(56) References Cited

U.S. PATENT DOCUMENTS

| 6,282,299 | B1 * | 8/2001 | Tewfik | ................ | H04N 19/132 |
| | | | | | 375/E7.238 |
| 2004/0001611 | A1 * | 1/2004 | Celik | ..................... | G06T 1/005 |
| | | | | | 382/100 |

FOREIGN PATENT DOCUMENTS

| CN | 101105857 A | 1/2008 |
| CN | 102034219 A | 4/2011 |

(Continued)

*Primary Examiner* — Christopher Wait
(74) *Attorney, Agent, or Firm* — Vivacqua Crane PLLC

(57) ABSTRACT

The present disclosure discloses an error modeling method and device for prediction context of reversible image watermarking. A predictor based on omnidirectional context is established; then, the prediction context is self-adaptively error modeled to obtain a self-adaptive error model; and finally, output data from the self-adaptive error model is fed back to the predictor to update and correct the prediction context, so as to correct a prediction value of a current pixel x[i,j]. Since the non-linear correlation between the current pixel and the prediction context thereof, i.e., the non-linear correlation redundancy between pixels can be found by the error modeling of the prediction context of the predictor, the non-linear correlation redundancy between the pixels can be effectively removed. Thus, the embeddable watermarking capacity can be increased.

8 Claims, 2 Drawing Sheets

(56) References Cited

FOREIGN PATENT DOCUMENTS

| CN | 102036079 A | 4/2011 |
| CN | 108022197 A | 5/2018 |

\* cited by examiner

|     | j−1 | j | j+1 |
|-----|-----|---|-----|
| i−1 | NW  | N | NE  |
| i   | W   | ? | E   |
| i+1 | SW  | S | SE  |

Fig.2

ERROR MODELING METHOD AND DEVICE FOR PREDICTION CONTEXT OF REVERSIBLE IMAGE WATERMARKING

CROSS REFERENCE TO RELATED APPLICATIONS

This application is a national stage application under 35 U.S.C. 371 of PCT Application No. PCT/CN2018/107914, filed on 27 Sep. 2018, which PCT application claimed the benefit of Chinese Patent Application No. 2018110712119, filed on 13 Sep. 2018, the entire disclosure of each of which are hereby incorporated herein by reference.

TECHNICAL FIELD

The present disclosure relates to the technical field of reversible image watermarking and in particular to an error modeling method and device for prediction context of reversible image watermarking.

BACKGROUND

Reversible watermarking becomes the current research hotspot of the digital watermarking technology. Compared with the traditional digital watermarking technology, reversible watermarking can completely restore the original host information without distortion. Reversible watermarking has great research value and good application prospect, especially for application fields with high fidelity requirements on the original host information, for example, application fields such as aerial photography information collection. When reversible image watermark embedding is performed on an image, the image needs to be compressed, which often requires a predictor. However, the redundancy in the image cannot be completely removed by simply estimating the current pixel value from the prediction context in the predictor. Most of the prediction algorithms made by predictors are linear, which can effectively analyze the linear correlation redundancy between pixels, but cannot remove the non-linear correlation redundancy between pixels, such as texture redundancy.

SUMMARY

In order to overcome the shortcomings in the prior art, an objective of the present disclosure is to provide an error modeling method and device for prediction context of reversible image watermarking. By the error modeling of the prediction context of a predictor to find the non-linear correlation between a current pixel and the prediction context thereof, the non-linear correlation redundancy between pixels can be effectively removed.

To address the problem, the present disclosure uses the following technical solution.

An error modeling method for prediction context of reversible image watermarking is provided, which comprises following steps:

S1: scanning an original image to obtain a current pixel $x[i,j]$ and adjacent pixels surrounding the current pixel;

S2: constructing prediction context according to the current pixel $x[i,j]$ and the adjacent pixels surrounding the current pixel, and establishing a predictor based on omnidirectional context;

S3: self-adaptively error molding for the prediction context to obtain a self-adaptive error model; and S4: feeding output data from the self-adaptive error model back to the predictor to update and correct the prediction context, so as to correct a prediction value of the current pixel $x[i,j]$.

Further, in the step S2, a predictor based on omnidirectional context is established, the formula for the predictor being:

$$\hat{x}[i,j] = \frac{x_n + x_w + x_e + x_s}{4} = \frac{x[i-1,j] + x[i,j-1] + x[i,j+1] + x[i+1,j]}{4}$$

where, $\hat{x}[i,j]$ is the prediction value of the pixel $x[i,j]$, $x_n$ is a pixel located directly above the pixel $x[i,j]$, $x_w$ is a pixel located directly to the left of the pixel $x[i,j]$, $x_e$ is a pixel located directly to the right of the pixel $x[i,j]$, and $x_s$ is a pixel located directly below the pixel $x[i,j]$.

Further, self-adaptively error molding the prediction context in the step S3 comprises following steps:

S31: dividing the original image into four sub-images, the original image being $I=\{x[i,j]|1\leq i\leq H, 1\leq j\leq W\}$, where H and W are the height and width of the original image, the four sub-images being:

$$U_1=\{u_1[i,j]=x[2i,2j]|1\leq i\leq H', 1\leq j\leq W'\}$$

$$U_2=\{u_2[i,j]=x[2i,2j+1]|1\leq i\leq H', 1\leq j\leq W'\}$$

$$U_3=\{u_3[i,j]=x[2i+1,2j]|1\leq i\leq H', 1\leq j\leq W'\}$$

$$U_4=\{u_4[i,j]=x[2i+1,2j+1]|1\leq i\leq H', 1\leq j\leq W'\}$$

where, H' and W' are the height and width of the sub-image $U_1$, the sub-image $U_2$, the sub-image $U_3$ and the sub-image $U_4$, respectively, and H'≤H and W'≤W;

S32: quantifying the value of the prediction context;

S33: calculating, by the quantified prediction context, a prediction error of pixels in the four sub-images, the prediction error being obtained by:

$$e[i,j]=u[i,j]-\hat{u}[i,j]$$

where, $u[i,j]$ is the pixel in the sub-image, $\hat{u}[i,j]$ is the prediction value of the pixel in the sub-image, and $e[i,j]$ is the prediction error of the pixel in the sub-image; and S34: establishing a self-adaptive error model according to the prediction error.

Further, the height H' and the width W' of the sub-image $U_1$, the sub-image $U_2$, the sub-image $U_3$ and the sub-image $U_4$ satisfy the following condition, respectively:

$$H'=\lfloor(H-2)/2\rfloor$$

$$W'=\lfloor(W-2)/2\rfloor.$$

Further, in the step S4, output data from the self-adaptive error model is fed back to the predictor to update and correct the prediction context, so as to correct a prediction value of the current pixel $x[i,j]$, and the corrected prediction value $\dot{x}$ of the current pixel $x[i,j]$ is obtained by:

$$\dot{x}=\hat{x}+\bar{e}(d,t)$$

where, t is the parameter for the quantified predicated context, d is the prediction error of the predictor, $\bar{e}(d,t)$ is the error feedback fed back to the predictor by the self-adaptive error model, and $\hat{x}$ is the prediction value of the current pixel $x[i,j]$ before correction.

A device for storing an error modeling method for prediction context of reversible image watermarking, comprising a control module and a storage medium used for storing control instructions, the control module being configured to read the control instructions in the storage medium and execute the following steps:

Q1: scanning an original image to obtain a current pixel x[i,j] and adjacent pixels surrounding the current pixel;

Q2: constructing prediction context according to the current pixel x[i,j] and the adjacent pixels surrounding the current pixel, and establishing a predictor based on omnidirectional context;

Q3: self-adaptively error molding the prediction context to obtain a self-adaptive error model; and Q4: feeding output data from the self-adaptive error model back to the predictor to update and correct the prediction context, so as to correct a prediction value of the current pixel x[i,j].

Further, when the control module executes the step Q2, a predictor based on omnidirectional context is established, the formula for the predictor being:

$$\hat{x}[i, j] = \frac{x_n + x_w + x_e + x_s}{4} = \frac{x[i-1, j] + x[i, j-1] + x[i, j+1] + x[i+1, j]}{4}$$

where, $\hat{x}[i,j]$ is the prediction value of the pixel x[i,j], $x_n$ is a pixel located directly above the pixel x[i,j], $x_w$ is a pixel located directly to the left of the pixel x[i,j], $x_e$ is a pixel located directly to the right of the pixel x[i,j], and $x_s$ is a pixel located directly below the pixel x[i,j].

Further, when the control module executes the step Q3, self-adaptively error molding the prediction context comprises following steps:

Q31: dividing the original image into four sub-images, the original image being I={x[i,j]|1≤i≤H,1≤j≤W}, where H and W are the height and width of the original image, the four sub-images being:

$$U_1 = \{u_1[i,j] = x[2i, 2j] | 1 \le i \le H', 1 \le j \le W'\}$$

$$U_2 = \{u_2[i,j] = x[2i, 2j+1] | 1 \le i \le H', 1 \le j \le W'\}$$

$$U_3 = \{u_3[i,j] = x[2i+1, 2j] | 1 \le i \le H', 1 \le j \le W'\}$$

$$U_4 = \{u_4[i,j] = x[2i+1, 2j+1] | 1 \le i \le H', 1 \le j \le W'\}$$

where, H' and W' are the height and width of the sub-image $U_1$, the sub-image $U_2$, the sub-image $U_3$ and the sub-image $U_4$, respectively, and H'≤H and W'≤W;

Q32: quantifying the value of the prediction context;

Q33: calculating, by the quantified prediction context, a prediction error of pixels in the four sub-images, the prediction error being obtained by:

$$e[i,j] = u[i,j] - \hat{u}[i,j]$$

where, u[i,j] is the pixel in the sub-image, û[i,j] is the prediction value of the pixel in the sub-image, and e[i,j] is the prediction error of the pixel in the sub-image; and Q34: establishing a self-adaptive error model according to the prediction error.

Further, the height H' and the width W' of the sub-image $U_1$, the sub-image $U_2$, the sub-image $U_3$ and the sub-image $U_4$ satisfy the following condition, respectively:

$$H' = \lfloor (H-2)/2 \rfloor$$

$$W' = \lfloor (W-2)/2 \rfloor.$$

Further, when the control module executes the step Q4, output data from the self-adaptive error model is fed back to the predictor to update and correct the prediction context, so as to correct a prediction value of the current pixel x[i,j], and the corrected prediction value $\dot{x}$ of the current pixel x[i,j] is obtained by:

$$\dot{x} = \hat{x} + \overline{e}(d,t)$$

where, t is the parameter for the quantified predicated context, d is the prediction error of the predictor, $\overline{e}(d,t)$ is the error feedback fed back to the predictor by the self-adaptive error model, and $\hat{x}$ is the prediction value of the current pixel x[i,j] before correction.

The present disclosure has the following beneficial effect. In the error modeling method and device for prediction context of reversible image watermarking, the non-linear correlation redundancy in the image cannot be completely removed by simply estimating the current pixel value from the prediction context in the predictor, and therefore, first, a predictor based on omnidirectional context is established; then, the prediction context is self-adaptively error modeled to obtain a self-adaptive error model; and finally, output data from the self-adaptive error model is fed back to the predictor to update and correct the prediction context, so as to correct a prediction value of a current pixel x[i,j]. Since the non-linear correlation between the current pixel and the prediction context thereof, i.e., the non-linear correlation redundancy between pixels can be found by the error modeling of the prediction context of the predictor, the non-linear correlation redundancy between the pixels can be effectively removed. Thus, the embeddable watermarking capacity can be increased.

BRIEF DESCRIPTION OF THE DRAWINGS

The present disclosure will be further described below with reference to the accompanying drawings and specific embodiments.

FIG. 2 is a schematic view of prediction context of the predictor.

DETAILED DESCRIPTION

Figure 1:
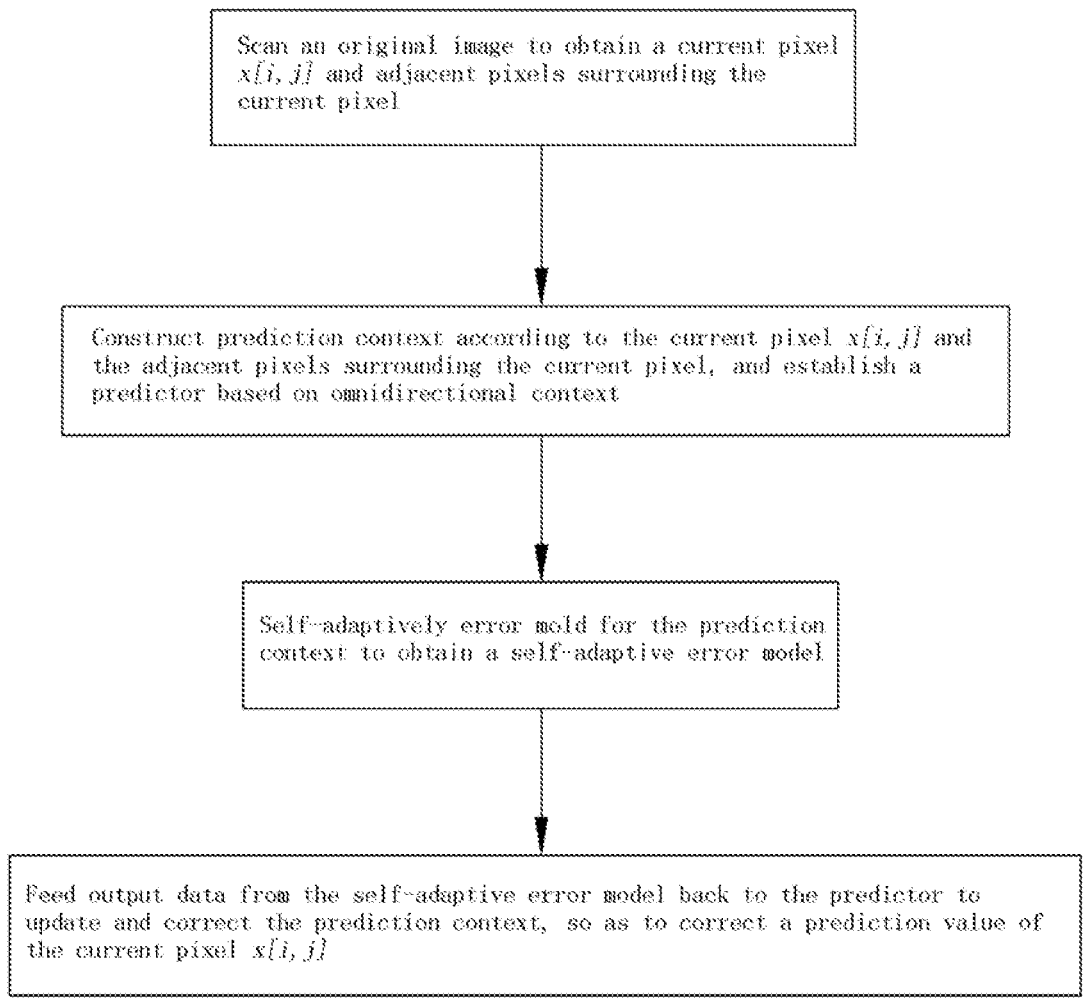
FIG. 1 is the flowchart of an error modeling method according to the present disclosure.
Figure 2:
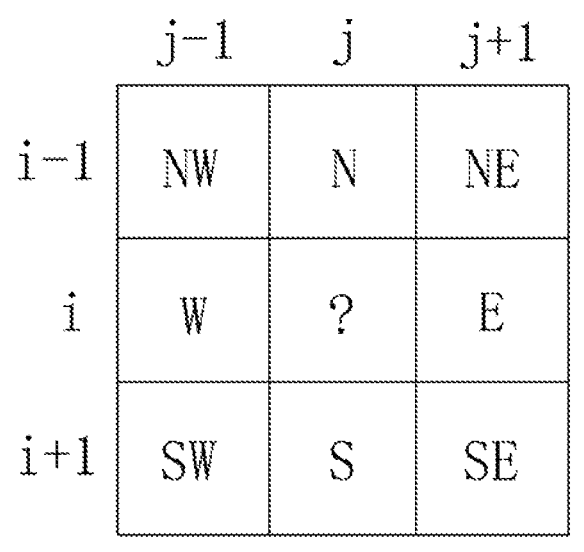

With reference to FIGS. 1 and 2, an error modeling method for prediction context of reversible image watermarking is provided, which comprises following steps:

S1: scanning an original image to obtain a current pixel x[i,j] and adjacent pixels surrounding the current pixel;

S2: constructing prediction context according to the current pixel x[i,j] and the adjacent pixels surrounding the current pixel, and establishing a predictor based on omnidirectional context;

S3: self-adaptively error molding the prediction context to obtain a self-adaptive error model; and S4: feeding output data from the self-adaptive error model back to the predictor to update and correct the prediction context, so as to correct a prediction value of the current pixel x[i,j].

Wherein, in the step S2, a predictor based on omnidirectional context is established, the formula for the predictor being:

$$\hat{x}[i, j] = \frac{x_n + x_w + x_e + x_s}{4} = \frac{x[i-1, j] + x[i, j-1] + x[i, j+1] + x[i+1, j]}{4}$$

where, $\hat{x}[i,j]$ is the prediction value of the pixel x[i,j], $x_n$ is a pixel located directly above the pixel x[i,j], $x_w$ is a pixel located directly to the left of the pixel x[i,j], $x_e$ is a pixel located directly to the right of the pixel x[i,j], and $x_s$ is a pixel located directly below the pixel x[i,j].

Wherein, self-adaptively error molding the prediction context in the step S3 comprises following steps:

S31: dividing the original image into four sub-images, the original image being I={x[i,j]|1≤i≤H,1≤j≤W}, where H and W are the height and width of the original image, the four sub-images being:

$U_1=\{u_1[i,j]=x[2i,2j]|1\le i\le H', 1\le j\le W'\}$ $U_2=\{u_2[i,j]=x[2i,2j+1]|1\le i\le H', 1\le j\le W'\}$ $U_3=\{u_3[i,j]=x[2i+1,2j]|1\le i\le H', 1\le j\le W'\}$ $U_4=\{u_4[i,j]=x[2i+1,2j+1]|1\le i\le H', 1\le j\le W'\}$ where, H' and W' are the height and width of the sub-image $U_1$, the sub-image $U_2$, the sub-image $U_3$ and the sub-image $U_4$, respectively, and H' and W' satisfy the following condition, respectively:

$H'=\lfloor(H-2)/2\rfloor$ $W'=\lfloor(W-2)/2\rfloor$;

S32: quantifying the value of the prediction context;

S33: calculating, by the quantified prediction context, a prediction error of pixels in the four sub-images, the prediction error being obtained by:

$e[i,j]=u[i,j]-\hat{u}[i,j]$ where, u[i,j] is the pixel in the sub-image, û[i,j] is the prediction value of the pixel in the sub-image, and e[i,j] is the prediction error of the pixel in the sub-image; and S34: establishing a self-adaptive error model according to the prediction error.

Specifically, in the step S34, a self-adaptive error model is established according to the prediction error. The self-adaptive error model is a model commonly used in reversible image watermarking, and has different expression forms and may be established in different methods according to different practical parameters. However, the error modeling method for prediction context of reversible image watermarking as disclosed in the present disclosure is neither limited to the use of a certain specific self-adaptive error model, nor limited to a certain specific method for establishing a self-adaptive error model. By the error modeling method of the present disclosure, only output data from the self-adaptive error model is fed back to the predictor to update the prediction context of the predictor. Therefore, the specific method for establishing the self-adaptive error model will not be repeated here.

Wherein, in the step S4, output data from the self-adaptive error model is fed back to the predictor to update and correct the prediction context, so as to correct a prediction value of the current pixel x[i,j], and the corrected prediction value $\dot{x}$ of the current pixel x[i,j] is obtained by:

$\dot{x}=\hat{x}+\bar{e}(d,t)$ where, t is the parameter for the quantified predicated context, d is the prediction error of the predictor, $\bar{e}(d,t)$ is the error feedback fed back to the predictor by the self-adaptive error model, and x̂ is the prediction value of the current pixel x[i,j] before correction.

Additionally, a device for storing an error modeling method for prediction context of reversible image watermarking is provided, comprising a control module and a storage medium used for storing control instructions, the control module being configured to read the control instructions in the storage medium and execute the following steps:

Q1: scanning an original image to obtain a current pixel x[i,j] and adjacent pixels surrounding the current pixel;

Q2: constructing prediction context according to the current pixel x[i,j] and the adjacent pixels surrounding the current pixel, and establishing a predictor based on omnidirectional context;

Q3: self-adaptively error molding the prediction context to obtain a self-adaptive error model; and Q4: feeding output data from the self-adaptive error model back to the predictor to update and correct the prediction context, so as to correct a prediction value of the current pixel x[i,j].

Wherein, when the control module executes the step Q2, a predictor based on omnidirectional context is established, the formula for the predictor being:

$$\hat{x}[i,j] = \frac{x_n+x_w+x_e+x_s}{4} = \frac{x[i-1,j]+x[i,j-1]+x[i,j+1]+x[i+1,j]}{4}$$

where, x̂[i,j] is the prediction value of the pixel x[i,j], $x_n$ is a pixel located directly above the pixel x[i,j], $x_w$ is a pixel located directly to the left of the pixel x[i,j], $x_e$ is a pixel located directly to the right of the pixel x[i,j], and $x_s$ is a pixel located directly below the pixel x[i,j].

Wherein, when the control module executes the step Q3, self-adaptively error molding the prediction context comprises following steps:

Q31: dividing the original image into four sub-images, the original image being I={x[i,j]|1≤i≤H,1≤j≤W}, where H and W are the height and width of the original image, the four sub-images being:

$U_1=\{u_1[i,j]=x[2i,2j]|1\le i\le H', 1\le j\le W'\}$ $U_2=\{u_2[i,j]=x[2i,2j+1]|1\le i\le H', 1\le j\le W'\}$ $U_3=\{u_3[i,j]=x[2i+1,2j]|1\le i\le H', 1\le j\le W'\}$ $U_4=\{u_4[i,j]=x[2i+1,2j+1]|1\le i\le H', 1\le j\le W'\}$ where, H' and W' are the height and width of the sub-image $U_1$, the sub-image $U_2$, the sub-image $U_3$ and the sub-image $U_4$, respectively, and H'≤H and W'≤W;

Q32: quantifying the value of the prediction context;

Q33: calculating, by the quantified prediction context, a prediction error of pixels in the four sub-images, the prediction error being obtained by:

$e[i,j]=u[i,j]-\hat{u}[i,j]$ where, u[i,j] is the pixel in the sub-image, û[i,j] is the prediction value of the pixel in the sub-image, and e[i,j] is the prediction error of the pixel in the sub-image; and Q34: establishing a self-adaptive error model according to the prediction error.

Wherein, the height H' and the width W' of the sub-image $U_1$, the sub-image $U_2$, the sub-image $U_3$ and the sub-image $U_4$ satisfy the following condition, respectively:

$H'=\lfloor(H-2)/2\rfloor$ $W'=\lfloor(W-2)/2\rfloor$.

Wherein, when the control module executes the step Q4, output data from the self-adaptive error model is fed back to the predictor to update and correct the prediction context, so as to correct a prediction value of the current pixel x[i,j], and the corrected prediction value ẋ of the current pixel x[i,j] is obtained by:

$$\dot{x}=\hat{x}+\bar{e}(d,t)$$

where, t is the parameter for the quantified predicated context, d is the prediction error of the predictor, $\bar{e}(d,t)$ is the error feedback fed back to the predictor by the self-adaptive error model, and $\hat{x}$ is the prediction value of the current pixel x[i,j] before correction.

Specifically, the non-linear correlation redundancy in the image cannot be completely removed by simply estimating the current pixel value from the prediction context in the predictor, and therefore, first, a predictor based on omnidirectional context is established; then, the prediction context is self-adaptively error modeled to obtain a self-adaptive error model; and finally, output data from the self-adaptive error model is fed back to the predictor to update and correct the prediction context, so as to correct a prediction value of a current pixel x[i,j]. Since the non-linear correlation between the current pixel and the prediction context thereof, i.e., the non-linear correlation redundancy between pixels can be found by the error modeling of the prediction context of the predictor, the non-linear correlation redundancy between the pixels can be effectively removed. Thus, the embeddable watermarking capacity can be increased.

For half-directional predictors or omnidirectional predictors, the prediction algorithm is mostly linear. Such a linear algorithm can effectively analyze the linear correlation redundancy between pixels, but fails to remove the non-linear correlation redundancy between the pixels, such as texture redundancy. However, by modeling the prediction context of the predictor, the non-linear correlation between the current pixel and the prediction context thereof can be found. Since the predictor used in this embodiment is a predictor based on omnidirectional context, the prediction context of the predictor is composed of at least eight pixels surrounding the current pixel, and each pixel has a value between 0 and 255. If the prediction context of the predictor is directly modeled, the model will have 8×256 cases, which will lead to a large amount of calculation and thus reduce the calculation efficiency. Therefore, the value of the prediction context is first quantified, and then the self-adaptive error modeling is performed using the quantified prediction context. In addition, because there is a certain correlation between prediction errors, the use of self-adaptive error modeling can also effectively eliminate the prediction bias of the predictor, thereby improving the prediction accuracy of the predictor. Then, the output data from the self-adaptive error model is fed back to the predictor, and the prediction context is updated and corrected, so as to correct the prediction value of the current pixel x[i,j]. Since the corrected prediction value can reduce the prediction error of the predictor, the accuracy of prediction can be enhanced. When quantifying the value of the prediction context, assuming that the parameter for the quantified prediction context is t and the prediction error of the predictor is d, then the error feedback $\bar{e}(d,t)$ can be obtained. Then, the error feedback $\bar{e}(d,t)$ is used to correct the predictor, and the current pixel x[i,j] after introducing the corrected prediction value will become ẋ from $\hat{x}$, that is, $\dot{x}=\hat{x}+\bar{e}(d,t)$. In this case, the corrected ẋ will be closer to x than $\hat{x}$. Therefore, the prediction error will be smaller, which can effectively increase the embeddable watermarking capacity.

The preferred embodiments of the present disclosure have been specifically described. However, the present disclosure is not limited to those implementations. A person of ordinary skill in the art may make various equivalent variations or replacements without departing from the spirit of the present disclosure, and those equivalent variations or replacements shall be included in the scope defined by the appended claims.

The invention claimed is:

1. An error modeling method for prediction context for reversible image watermarking, comprising following steps:
   S1: scanning an original image to obtain a current pixel x[i,j] and adjacent pixels surrounding the current pixel;
   S2: constructing prediction context according to the current pixel x[i,j] and the adjacent pixels surrounding the current pixel, and establishing a predictor based on omnidirectional context;
   S3: self-adaptively error molding the prediction context to obtain a self-adaptive error model; and
   S4: feeding output data from the self-adaptive error model back to the predictor to update and correct the prediction context, so as to correct a prediction value of the current pixel x[i,j];
   wherein the corrected prediction value ẋ of the current pixel x[i,j] is obtained by:

$$\dot{x}=\hat{x}+\bar{e}(d,t)$$

where, t is the parameter for the quantified predicated context, d is the prediction error of the predictor, $\bar{e}(d,t)$ is the error feedback fed back to the predictor by the self-adaptive error model, and $\hat{x}$ is the prediction value of the current pixel x[i,j] before correction.

2. The error modeling method for prediction context for reversible image watermarking according to claim 1, characterized in that, in the step S2, a predictor based on omnidirectional context is established, the formula for the predictor being:

$$\hat{x}[i,j] = \frac{x_n + x_w + x_e + x_s}{4} = \frac{x[i-1,j] + x[i,j-1] + x[i,j+1] + x[i+1,j]}{4}$$

where, $\hat{x}[i,j]$ is the prediction value of the pixel x[i,j], $x_n$ is a pixel located directly above the pixel x[i,j], $x_w$ is a pixel located directly to the left of the pixel x[i,j], $x_e$ is a pixel located directly to the right of the pixel x[i,j], and $x_s$ is a pixel located directly below the pixel x[i,j].

3. The error modeling method for prediction context for reversible image watermarking according to claim 2, characterized in that self-adaptively error molding the prediction context in the step S3 comprises following steps:
   S31: dividing the original image into four sub-images, the original image being I={x[i,j]|1≤i≤H,1≤j≤W}, where H and W are the height and width of the original image, the four sub-images being:

$$U_1 = \{u_1[i,j] = x[2i,2j] | 1 \le i \le H', 1 \le j \le W'\}$$

$$U_2 = \{u_2[i,j] = x[2i,2j+1] | 1 \le i \le H', 1 \le j \le W'\}$$

$$U_3 = \{u_3[i,j] = x[2i+1,2j] | 1 \le i \le H', 1 \le j \le W'\}$$

$$U_4 = \{u_4[i,j] = x[2i+1,2j+1] | 1 \le i \le H', 1 \le j \le W'\}$$

where, H' and W' are the height and width of the sub-image $U_1$, the sub-image $U_2$, the sub-image $U_3$ and the sub-image $U_4$, respectively, and H'≤H and W'≤W;

S32: quantifying the value of the prediction context;

S33: calculating, by the quantified prediction context, a prediction error of pixels in the four sub-images, the prediction error being obtained by:

$$e[i,j]=u[i,j]-û[i,j]$$

where, $u[i,j]$ is the pixel in the sub-image, $û[i,j]$ is the prediction value of the pixel in the sub-image, and $e[i,j]$ is the prediction error of the pixel in the sub-image; and S34: establishing a self-adaptive error model according to the prediction error.

4. The error modeling method for prediction context for reversible image watermarking according to claim 3, characterized in that the height H' and the width W' of the sub-image $U_1$, the sub-image $U_2$, the sub-image $U_3$ and the sub-image $U_4$ satisfy the following condition, respectively:

$$H'=\lfloor(H-2)/2\rfloor$$

$$W'=\lfloor(W-2)/2\rfloor.$$

5. A device for storing an error modeling method for prediction context for reversible image watermarking, comprising a control module and a storage medium used for storing control instructions, the control module being configured to read the control instructions in the storage medium and execute the following steps:

Q1: scanning an original image to obtain a current pixel $x[i,j]$ and adjacent pixels surrounding the current pixel;

Q2: constructing prediction context according to the current pixel $x[i,j]$ and the adjacent pixels surrounding the current pixel, and establishing a predictor based on omnidirectional context;

Q3: self-adaptively error molding the prediction context to obtain a self-adaptive error model; and Q4: feeding output data from the self-adaptive error model back to the predictor to update and correct the prediction context, so as to correct a prediction value of the current pixel $x[i,j]$;

wherein the corrected prediction value $\dot{x}$ of the current pixel $x[i,j]$ is obtained by:

$$\dot{x}=\hat{x}+\overline{e}(d,t)$$

where, t is the parameter for the quantified predicated context, d is the prediction error of the predictor, $\overline{e}(d,t)$ is the error feedback fed back to the predictor by the self-adaptive error model, and $\hat{x}$ is the prediction value of the current pixel $x[i,j]$ before correction.

6. The device according to claim 5, characterized in that, when the control module executes the step Q2, a predictor based on omnidirectional context is established, the formula for the predictor being:

$$\hat{x}[i,j] = \frac{x_n + x_w + x_e + x_s}{4} = \frac{x[i-1,j]+x[i,j-1]+x[i,j+1]+x[i+1,j]}{4}$$

where, $\hat{x}[i,j]$ is the prediction value of the pixel $x[i,j]$, $x_n$ is a pixel located directly above the pixel $x[i,j]$, $x_w$ is a pixel located directly to the left of the pixel $x[i,j]$, $x_e$ is a pixel located directly to the right of the pixel $x[i,j]$, and $x_s$ is a pixel located directly below the pixel $x[i,j]$.

7. The device according to claim 6, characterized in that, when the control module executes the step Q3, self-adaptively error molding the prediction context comprises following steps:

Q31: dividing the original image into four sub-images, the original image being $I=\{x[i,j]|1\le i\le H, 1\le j\le W\}$, where H and W are the height and width of the original image, the four sub-images being:

$$U_1=\{u_1[i,j]=x[2i,2j]|1\le i\le H', 1\le j\le W'\}$$

$$U_2=\{u_2[i,j]=x[2i,2j+1]|1\le i\le H', 1\le j\le W'\}$$

$$U_3=\{u_3[i,j]=x[2i+1,2j]|1\le i\le H', 1\le j\le W'\}$$

$$U_4=\{u_4[i,j]=x[2i+1,2j+1]|1\le i\le H', 1\le j\le W'\}$$

where, H' and W' are the height and width of the sub-image $U_1$, the sub-image $U_2$, the sub-image $U_3$ and the sub-image $U_4$, respectively, and $H'\le H$ and $W'\le W$;

Q32: quantifying the value of the prediction context;

Q33: calculating, by the quantified prediction context, a prediction error of pixels in the four sub-images, the prediction error being obtained by:

$$e[i,j]=u[i,j]-û[i,j]$$

where, $u[i,j]$ is the pixel in the sub-image, $û[i,j]$ is the prediction value of the pixel in the sub-image, and $e[i,j]$ is the prediction error of the pixel in the sub-image; and Q34: establishing a self-adaptive error model according to the prediction error.

8. The device according to claim 7, characterized in that the height H' and the width W' of the sub-image $U_1$, the sub-image $U_2$, the sub-image $U_3$ and the sub-image $U_4$ satisfy the following condition, respectively:

$$H'=\lfloor(H-2)/2\rfloor$$

$$W'=\lfloor(W-2)/2\rfloor.$$

\* \* \* \* \*